(12) United States Patent
Simofi-Ilyes et al.

(10) Patent No.: US 12,312,991 B2
(45) Date of Patent: May 27, 2025

(54) VEHICLE COOLING SYSTEM

(71) Applicant: Brose Fahrzeugteile SE & Co. Kommanditgesellschaft, Würzburg, Würzburg (DE)

(72) Inventors: Attila Simofi-Ilyes, Clarkston, MI (US); Tao Hong, Farmington Hills, MI (US); John Fleck, Holly, MI (US)

(73) Assignee: Brose Fahrzeugteile SE & Co. Kommanditgesellschaft, Würzburg (DE)

( * ) Notice: Subject to any disclaimer, the term of this patent is extended or adjusted under 35 U.S.C. 154(b) by 246 days.

(21) Appl. No.: 17/947,594

(22) Filed: Sep. 19, 2022

(65) Prior Publication Data
US 2024/0093633 A1 Mar. 21, 2024

(51) Int. Cl.
*F01P 11/10* (2006.01)
*B60K 11/04* (2006.01)
*B60R 19/52* (2006.01)
*F04D 19/00* (2006.01)
*F04D 29/54* (2006.01)

(52) U.S. Cl.
CPC ............... *F01P 11/10* (2013.01); *B60K 11/04* (2013.01); *B60R 19/52* (2013.01); *F04D 19/002* (2013.01); *F04D 29/545* (2013.01)

(58) Field of Classification Search
CPC .................. F01P 11/10; B60K 11/04
See application file for complete search history.

(56) References Cited

U.S. PATENT DOCUMENTS

| | | | | |
|---|---|---|---|---|
| 4,587,810 | A | * | 5/1986 | Fletcher .................... F25C 1/22 62/340 |
| 11,028,858 | B2 | | 6/2021 | Fahrzeugteile |
| 2003/0121708 | A1 | * | 7/2003 | Laivins .................... B62J 17/10 180/68.1 |
| 2016/0009170 | A1 | * | 1/2016 | Schneider ................ F01P 11/10 180/68.1 |
| 2022/0402352 | A1 | * | 12/2022 | Feltham ............... B60H 1/3211 |

* cited by examiner

*Primary Examiner* — Kevin A Lathers
(74) *Attorney, Agent, or Firm* — Dickinson Wright PLLC

(57) ABSTRACT

A cooling system for a vehicle including an air duct having an inlet funnel configured to connect to a vehicle grill, a heat-exchanger seat defining an outlet window, and an upper panel extending from the inlet funnel over top of the outlet window. The upper panel defines an intake. At least one heat exchanger is received on the heat-exchanger seat. A cooling fan assembly is disposed under the at least one heat exchanger and includes a shroud and a fan.

20 Claims, 4 Drawing Sheets

VEHICLE COOLING SYSTEM

TECHNICAL FIELD

The present disclosure relates to a vehicle cooling system.

BACKGROUND

Many vehicles generally include cooling systems configured to cool one or more vehicle components. The cooling systems may include a plurality of heat exchangers and a fan assembly configured to draw air through the heat exchangers.

SUMMARY

According to one embodiment, a cooling system for a vehicle including an air duct having an inlet funnel configured to connect to a vehicle grill, a heat-exchanger seat defining an outlet window, and an upper panel extending from the inlet funnel over top of the outlet window. The upper panel defines an intake. At least one heat exchanger is received on the heat-exchanger seat. A cooling fan assembly is disposed under the at least one heat exchanger and includes a shroud and a fan driven by a motor.

According to another embodiment, a cooling system for a vehicle includes an air duct having an inlet funnel configured to connect to a vehicle grill, an outlet window, and an upper panel extending from the inlet funnel over top of the outlet window. At least one heat is exchanger attached to the air duct at the outlet window. A cooling fan assembly has a shroud, a fan, and a motor. The shroud is connected to the air duct opposite the outlet window and is disposed against the at least one heat exchanger. A seal is disposed between the at least one heat exchanger and the shroud.

According to yet another embodiment, a cooling system for a vehicle includes an air duct having an inlet funnel configured to connect to a vehicle grill, a heat-exchanger seat defining an outlet window, and an upper panel extending from the inlet funnel over top of the outlet window. The upper panel defines a hole. An intake has a grate received in the hole and a plurality of flaps pivotally attached to the grate. At least one heat exchanger is received on the heat-exchanger seat. A cooling fan assembly is disposed under the at least one heat exchanger and has a shroud and a motor-driven fan.

DETAILED DESCRIPTION

Figure 1:
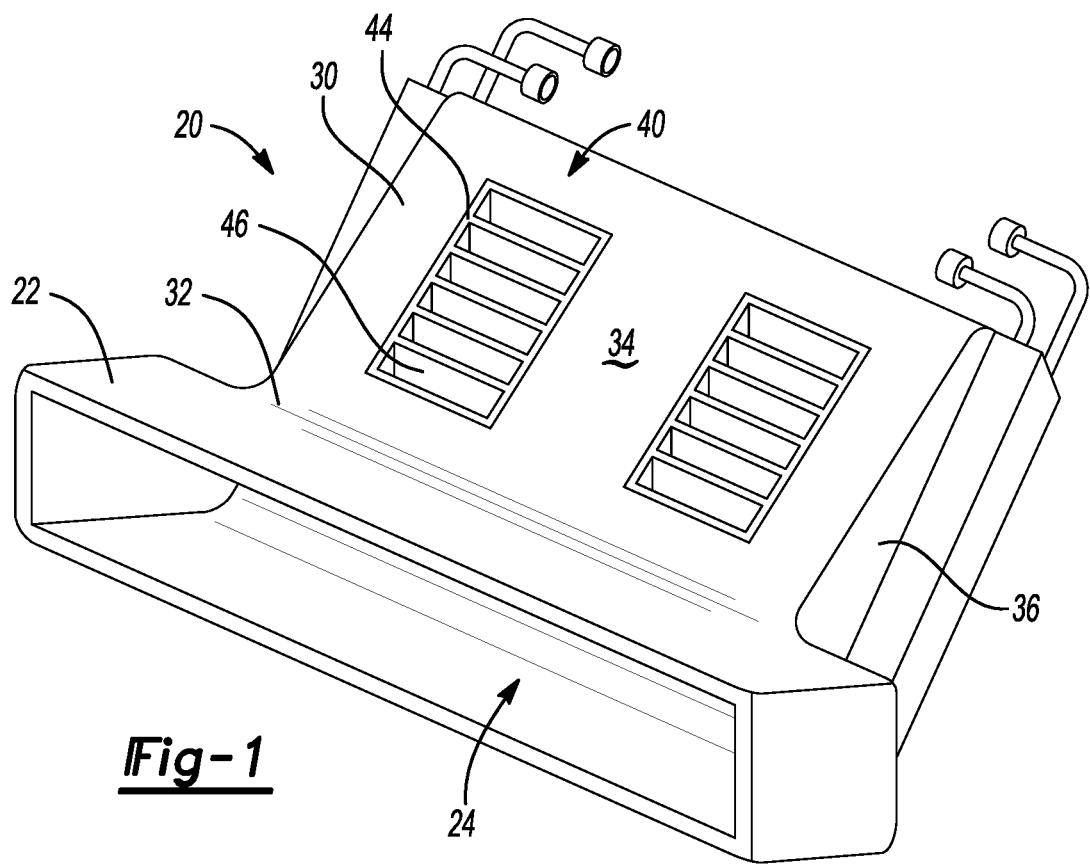
FIG. 1 is a perspective view of a vehicle cooling system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" may include any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A vehicle may include a cooling system configured to cool an engine, an electric motor, a condenser, etc. with outside air. The cooling system may have an air duct that directs air to at least one heat exchanger. The assembly my further include a cooling fan module configured to move air through the heat exchanger when ram air alone is insufficient. As one example, the heat exchanger may be a radiator or a condenser that transfers heat from a liquid coolant or refrigerant to an airstream. The heat source may be an internal combustion engine, an electric motor, power electronics, or other heat generating source. The side of the cooling fan module disposed closest to the heat exchanger may be referred to as the upstream side and the side disposed further away from the radiator may be referred to as the downstream side.

Figure 2:
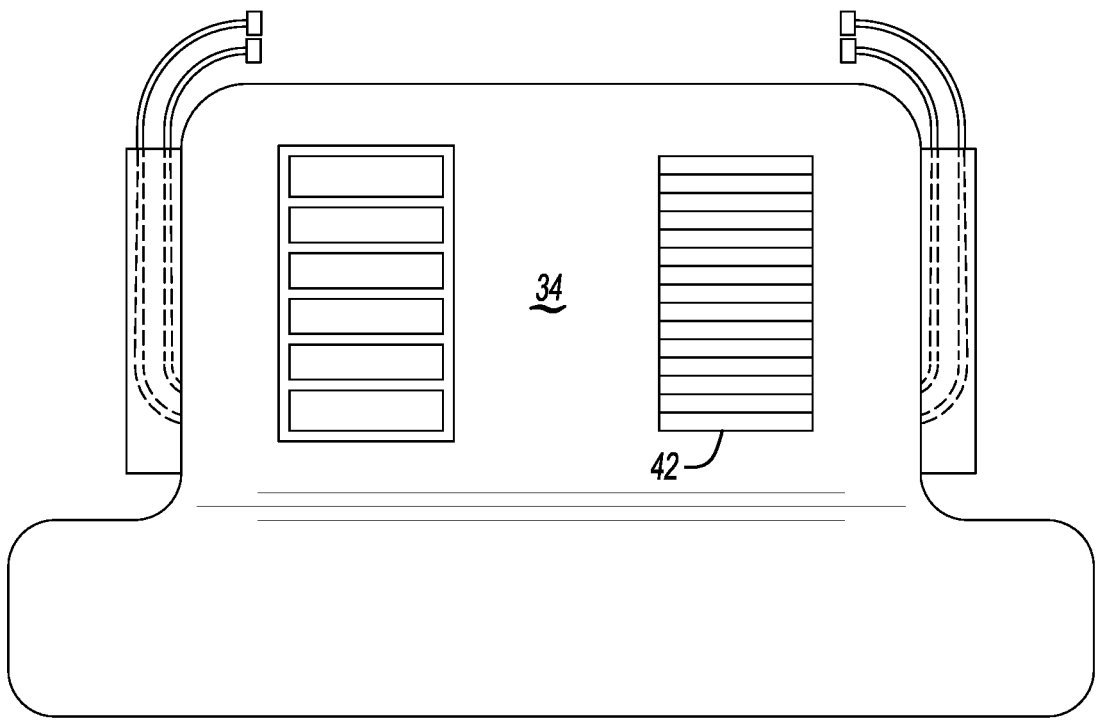
FIG. 2 is a top view of the vehicle cooling system with one of the air intakes omitted for illustrative purposes.
Figure 3A:
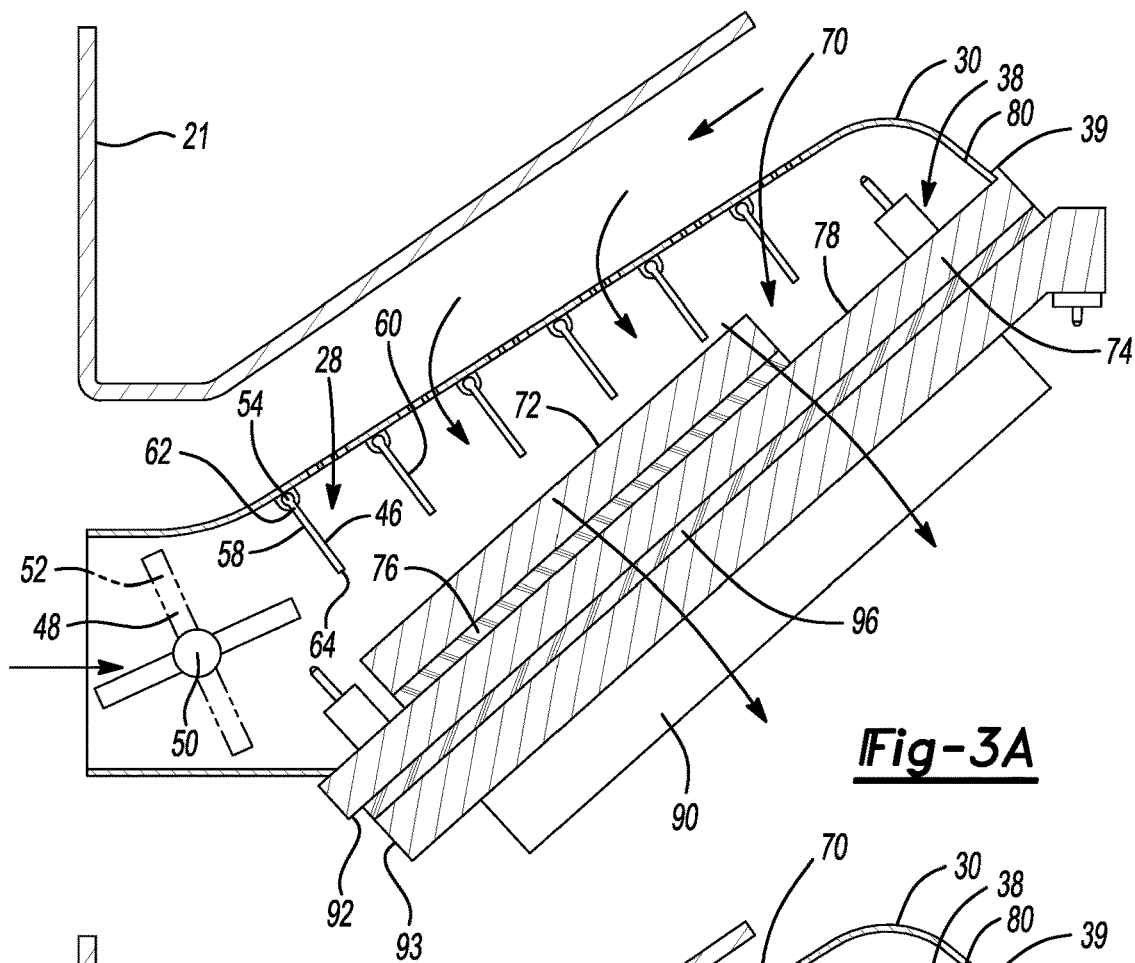
FIG. 3A is a side view, in cross section, of the vehicle cooling system when the vehicle is stationary.
Figure 3B:
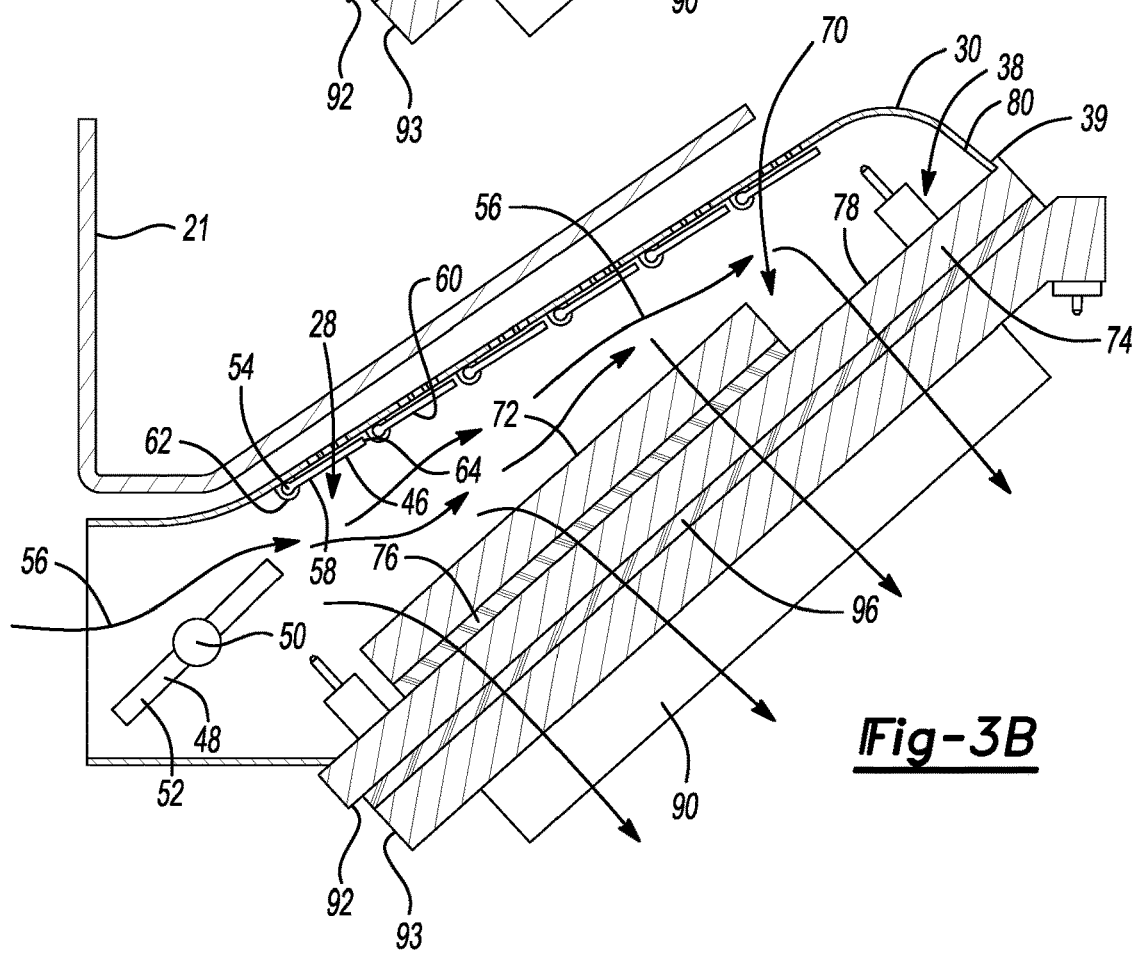
FIG. 3B is a side view, in cross section, of the vehicle cooling system when the vehicle is moving.

Referring to FIGS. 1, 2, and 3, a cooling system 20 for a vehicle cools one or more vehicle systems using air from outside the vehicle. The cooling system may be generally located at a front end of the vehicle behind a grill and underneath a hood. In some implementations, the cooling system 20 may be disposed under a front-storage area 21 sometimes referred to as a "frunk." The cooling system 20 includes an air duct 22 configured to receive air passing through the grill and direct the air through one or more heat exchangers and a fan assembly. The air duct 22 includes an inlet funnel 24 located behind the grill. The inlet funnel 24 may be configured to connect to a frame or body structure of the vehicle. For example, a seal 26 may be provided to seal the inlet funnel 24 to a backside of the grill or other body panel of the vehicle. The sealed connection between the inlet funnel 24 and the vehicle grill may increase airflow through the air duct 22.

The air duct 22 may further include a top cover 30 that is connected to the inlet funnel 24 at a front end 32 of the cover. The top cover 30 may include an upper panel 34 and one or more sidewalls 36 that cooperate to define an interior 28. The interior 28 is at least selectively in fluid communication with the inlet funnel 24. At the bottom of the cover 30 is a window 38, which is the outlet of the top cover 30. The window 38 may be shaped and sized according to the heat exchanger(s) of the cooling system 20. In the illustrated embodiment, the outlet window 38 is rectangular to match the largest of the heat exchangers. The top cover 30 is configured to receive air from the funnel 24 and circulate the air through the window 38 to the heat exchanger(s).

In the illustrated embodiment, the top cover 30 is wedge-shaped and oriented in the vehicle at an angle. That is, the upper panel 34 extends rearwardly from the inlet funnel 24 at an upward angle. The sidewalls 36 have variable height and are taller at the front end by the funnel 24 and gradually reduce in height towards the back 39 of the cover 30. This causes the interior 28 to also be wedge-shaped.

The top cover 30 may include one or more intakes 40 (sometimes referred to as intake vents). In the illustrated embodiment, the top cover 30 includes a pair of intakes 40. The intake 40 may be disposed in a hole 42 defined in the upper panel 34. The intake 40 extends through a thickness of the upper panel 34 and allows air to enter into the interior 28 through the intake 40. The one or more intakes 40 supplement the inlet funnel 24 to feed air into the interior 28 of the air duct 22. As will be explained in more detail below, the intakes 40 supplement the inlet funnel 24 when ram air through the grill is low or nonexistent, i.e., the vehicle is stationary or moving slowly. As the ram air builds, the intakes 40 provide less and less air and the inlet funnel 24 becomes the dominate source of cooling air. While the intakes 40 are shown on the upper panel 34, the intakes may be placed in any location upstream of the heat exchanger stack. For example, the intakes may be placed in a sidewall(s). In some embodiments, an intake(s) may be placed on the upper panel 34 and one or more additional intakes may be on a sidewall 36.

An air dam 48 may be provided in or just downstream of the inlet funnel 24. The air dam 48 is rotatable to increase and decrease an effective cross-sectional area of the funnel 24. The air dam 48 may include a closed position (smallest effective cross-sectional area) in which air is generally blocked from entering the interior 28 through the inlet funnel 24, an opened position (largest effective cross-sectional area) in which air is generally unobstructed, and a plurality of positions in between. The air dam 48 may be a pivotal member that includes a pivot point 50 and a blocking member 52. The blocking member 52 may be a planar structure as shown. The blocking member 52 may be substantially parallel to the airflow path 56 when the air dam 48 is in the opened position and the blocking member 52 may be substantially orthogonal to the airflow path when the air dam 48 is in the closed position. In some embodiments, the air dam 48 may not be completely closed when in the closed position. That is, a gap may be provided for the passage of air between the interior of the inlet funnel 24 and the edges of the blocking member 52. The air dam 48 may also be referred to as a valve. The pivotal air dam 48 is but one example and other arrangements are contemplated.

Each intake 40 may include a frame or grate 44 that supports one or more flaps 46. In the illustrated embodiment, each intake 40 includes a plurality of flaps 46 that are arranged in an array. Each flap 46 is attached to the grate 44 about a pivot axis 54, which extends in and out of the page from the orientation shown in FIG. 3A. The pivot axes 54 of the flaps 46 are substantially orthogonal (transverse) to the airflow path 56 so that the blocking surfaces 58 are also substantially orthogonal to the airflow path 56. The array of flaps 46 may be generally arranged one after another in a direction parallel to the direction of the airstream 56. Each of the flaps 46 may be a rectangular plate 60 having a fixed end 62 pivotally attached to the grate 44 and a free end 64 that sweeps along an arc of the flap 46.

The flaps 46 are movable between an opened position (see FIG. 3A) in which the flap depends downwardly from the grate 44 and a closed position (see FIG. 3B) in which the flaps are disposed against the grate or each other to inhibit airflow through the air intake 40. The flaps 46 may be passively actuated and may be biased, such as by gravity, to the opened position (down position). The flaps remain in this state until acted upon by the airstream 56. As the pressure generated by the airstream 56 increases, this pressure urges the flaps 46 to rotate towards the closed position. This generally occurs as the vehicle increases in speed. For example, at low speed, the airstream 56 flowing through the inlet funnel 24 is low and insufficient to close the flaps 46. The flaps 46 remain open and provide a secondary entrance point for air to enter into the interior 28. Therefore, airflow through the intakes 40, via the open flaps, supplements the lack of air flowing through the inlet funnel 24 due to the low speed. As the vehicle speed increases, the airstream 56 is sufficient to extract heat from the heat exchangers and the flaps 46 (which are no longer needed to provide the secondary entrance point into the interior 28) are rotated to the closed position by the increased pressure of the airstream 56.

While the above-described flaps 46 are described as being gravity and pressure operated, the flaps may also be mechanically actuated. For example, an actuator mechanism, such as an electronic actuator, may rotate the flaps between the open and closed positions.

The cooling system 20 may include one or more heat exchangers arranged in a stack, which may be referred to as heat exchanger stack 70. In the illustrated embodiment, the stack 70 includes a pair of heat exchangers 72 and 74. The upper heat exchanger 72 may be smaller than the lower heat exchanger 74, or alternatively, the heat exchangers may be the same size. In the illustrated embodiment, the upper heat exchanger 72 is a condenser of an air conditioning system and the lower heat exchanger 74 is a radiator of a battery cooling system. The upper heat exchanger 72 may be secured to the lower heat exchanger 74 with a seal 76 disposed therebetween. The seal 76 ensures that air exiting the condenser 72 flows through the lower radiator 74. The seal 76 may extend around a border of the heat exchanger 72. The seal 76 be made of foam, rubber, or other suitable material.

An upper side 78 of the heat exchanger 74 may be attached to the top cover 30. For example, the top cover 30 may include a heat-exchanger seat 80 that is configured to contact the heat exchanger 74. The heat exchanger seat 80 may border the outlet window 38. That is, the heat exchanger seat 80 may define the outlet window of the top cover 30. A seal (not shown) may be provided on the seat 80.

A cooling fan assembly 90 may be attached to the bottom side 92 of the heat exchanger 74. The cooling fan assembly aids in drawing the air stream 56 through the heat exchanger such as when the vehicle is stationary or increased heat rejection is required. The fan assembly 90 may include a shroud 93 and one or more fans 94. The shroud 93 may be the portion of the assembly 90 that connects to the bottom side 92 of the heat exchanger 74. As will be explained in more detail below, the shroud 93 may define a seat that is configured receive a portion of the heat exchanger 74. A seal 96 may be disposed between the shroud 93 and the bottom side 92 of the heat exchanger. The seal 96 may generally border the frame portion of the heat exchanger 74. In the illustrated embodiment, the seal 96 is a generally rectangular component. The seal 96 may be formed of foam, rubber, or other suitable material. The seal 96 limits air from escaping through the interface between the shroud 93 and the fan assembly 90 and may increase the negative pressure generated by the fan 94. This may lead to an overall improvement in the efficiency of the fan assembly 90.

Figure 4:
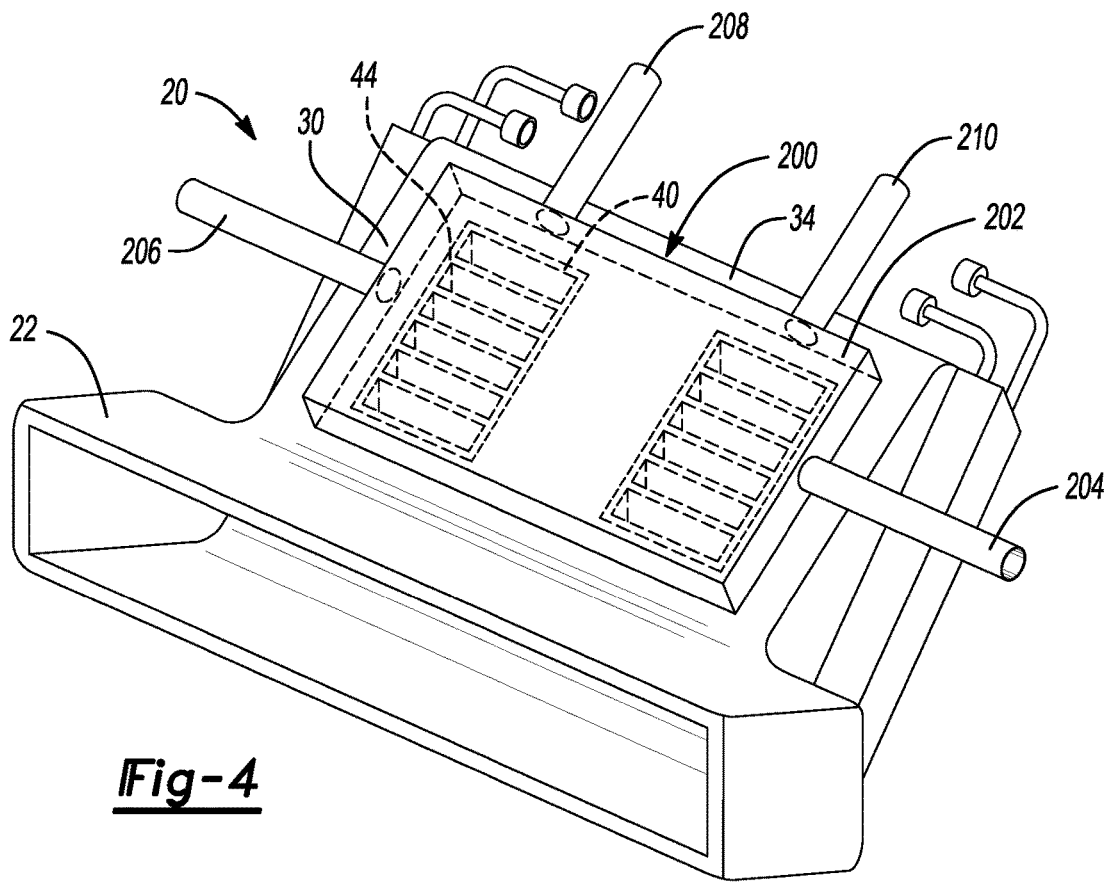
FIG. 4 is a top view of the vehicle cooling system and a diagrammatical view of an air-supply plenum for the air intakes.

Referring to FIG. 4, the intakes 40 may receive air from a plenum 200. The plenum 200 is configured to carry outside air to the intake(s) 40, which may be placed at a location that does not receive airflow otherwise. In the above illustrated example, the intakes 40 are placed below the front compartment and therefore require a plenum 200 to supply air to them. The plenum 200 may include a manifold 202 that is received over the intakes 40. The manifold 202 may include features for connecting to the top cover 30 and may include seals or gaskets or the like. One or more ducts 204 may supply air to the manifold 202. In the illustrated embodiment, a plurality of ducts 204 supply air to the manifold. For example, side ducts 206 may extend from side cutouts in the vehicle body to the manifold 202, and upper ducts 208 may supply air from hood vents. These are just examples, and the plenum 200 may receive air from any suitable location on the vehicle. While the manifold 202 is shown as a single manifold for feeding both intakes 40, the manifold 202 may be a pair of manifolds that are each associated with one of the intakes. In one or more embodiments, the manifold 202 may be integrally formed with the top cover 30.

Figure 5:
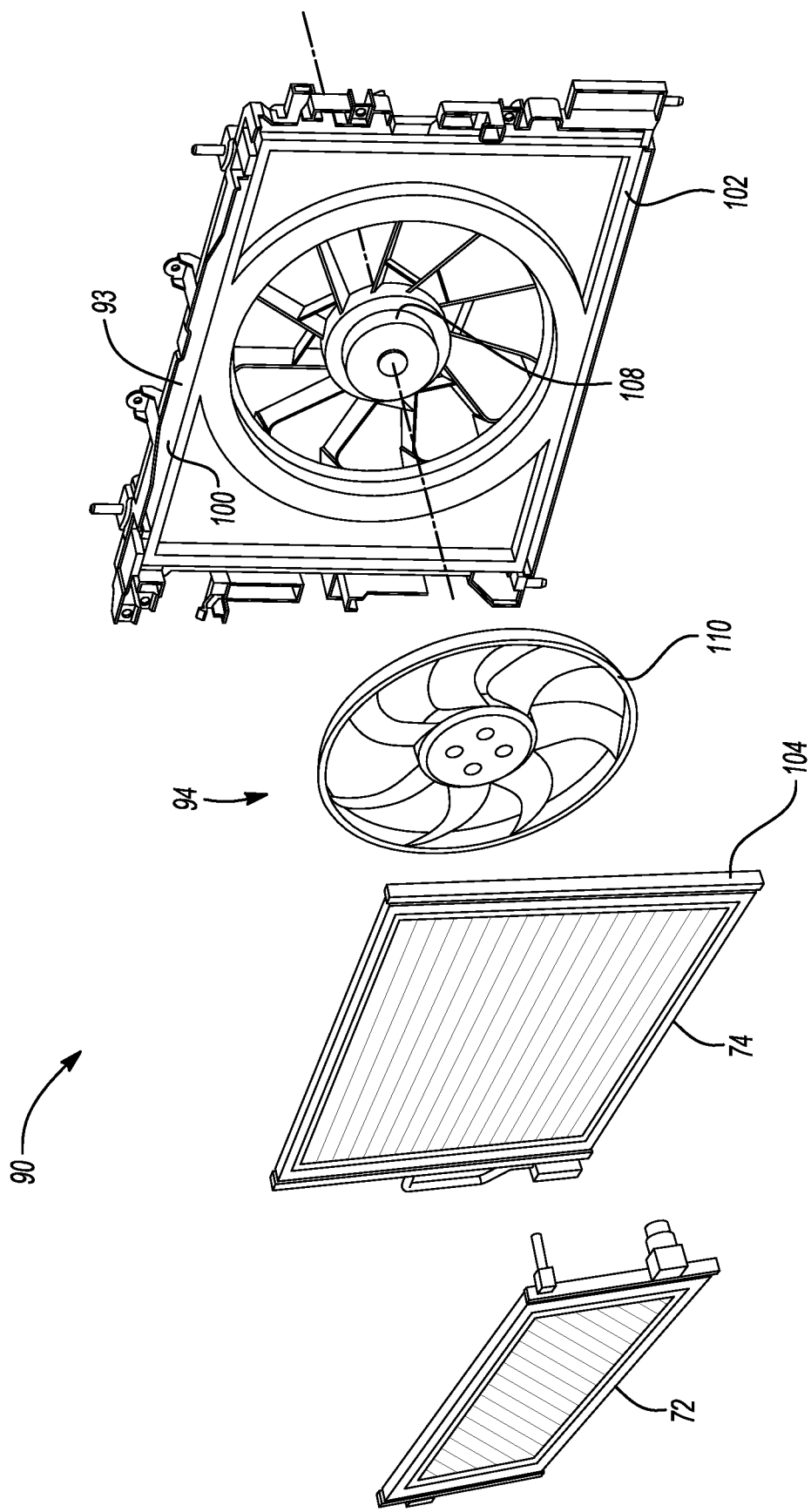
FIG. 5 is an exploded perspective view of an exemplary cooling fan assembly of the vehicle cooling system.

Referring to FIG. 5, the shroud 93 may have a plurality of sidewalls 100. The plurality of sidewalls 100 may include an upper sidewall, a lower sidewall, and a pair of lateral sidewalls. The shroud 93 is configured to be attachable to the heat exchanger(s). The sidewalls 100 may collectively define a seat 102 configured to receive the seal 96 (not shown). The sidewalls 100 may also be tall enough to at least partially extend over the outer border 104 of the heat exchanger 74. The shroud 93 may support one or more cooling fans 94. In the illustrated embodiment, the cooling fan assembly 90 has a single fan unit; however, dual-fan units may also be used in conjunction with the above-described air duct 22. The fan 94 is driven by a motor 108 supported by the shroud 93. A fan blade 110 is attached to a shaft of the motor 108. The fan blade 110 may include a plurality of blades that are arranged around a central hub, which connects to the motor shaft.

The one or more intakes 40 are less restrictive than the inlet funnel 24. Therefore, using utilizing the intakes 40 requires less power than drawing air through the inlet funnel 24 alone. That is, adding the intakes 40 may allow the system 20 to have a lower powered or smaller cooling fan assembly. This may reduce costs, lower noise, and improve efficiency of the system 20.

Figure 6:
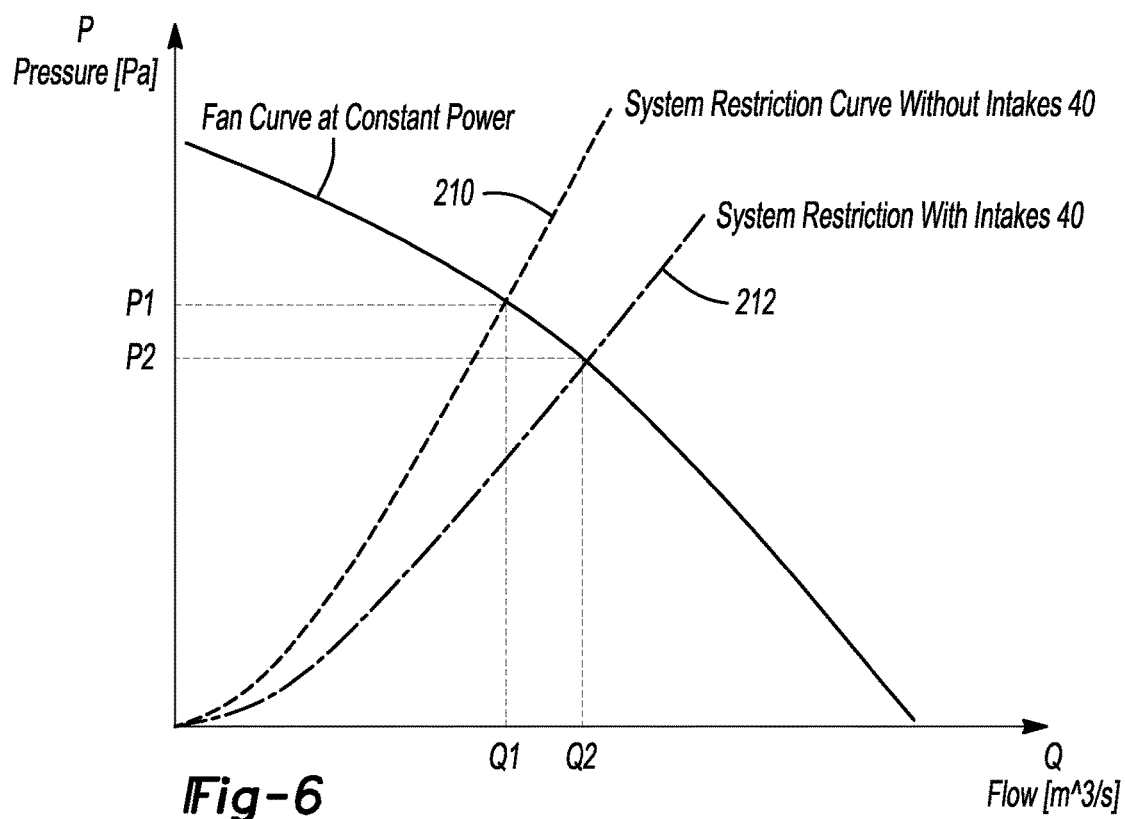
FIG. 6 are plots showing the effect and benefits of the air intakes.

This effect is shown in FIG. 6. FIG. 6 shows a plot 210 of the system 20 without the intakes 40 and a plot 212 of the system with the intakes. As can be seen, for the same fan power, the airflow rate Q2 going through the heat exchanger stack is increased significantly compared to the airflow rate Q1. This is due to a reduction in the restriction of the airflow resistance upstream of the heat exchangers when the intakes are implemented and open.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 20 cooling system
21 front-storage area
22 air duct
24 inlet funnel
26 seal
28 interior
30 top cover
32 front end
34 upper panel
36 sidewalls
38 outlet window
39 back
40 air intake
42 hole
44 grate
46 flaps
48 air dam
50 pivot point
52 member
54 pivot axis
56 airstream
58 surfaces
60 rectangular plate
62 end
64 free end
70 heat exchanger stack
72 heat exchanger
74 heat exchanger
76 seal
78 upper side
80 heat-exchanger seat
90 cooling fan assembly
92 bottom side
93 shroud
94 fan assembly
96 seal
100 sidewalls
102 seat
104 outer border
108 motor
110 fan blade
200 plenum
202 manifold
204 ducts
206 side ducts
208 upper ducts

What is claimed is:

1. A cooling system for a vehicle comprising:
an air duct including an inlet funnel configured to connect to a vehicle grill, an outlet window, and an upper panel extending from the inlet funnel over top of the outlet window, wherein the upper panel is disposed above the outlet window with respect to a vertical direction, the vertical direction being perpendicular to an opening direction of the funnel;
at least one heat exchanger attached to the air duct at the outlet window;
a cooling fan assembly including a shroud and a fan, the shroud being connected to the air duct opposite the outlet window and disposed against the at least one heat exchanger; and
a seal disposed between the at least one heat exchanger and the shroud.

2. The cooling system of claim 1, wherein the at least one heat exchanger includes a first heat exchanger and a second heat exchanger, wherein the first heat exchanger is attached to the air duct, and the second heat exchanger is disposed against the seal.

3. The cooling system of claim 2 further comprising a second seal disposed between the first and second heat exchangers.

4. The cooling system of claim 1, wherein the shroud defines a seal groove, and the seal is disposed in the seal groove.

5. The cooling system of claim 1, wherein the upper panel has an air intake.

6. The cooling system of claim 5, wherein the air intake includes at least one flap including an opened position and a closed position.

7. The cooling system of claim 5, wherein the air intake includes a grate and at least one flap pivotally attached to the grate and pivotable between an opened position in which the flap depends downwardly, with respect to the vertical direction, from the grate and a closed position in which the flap is rotated towards the grate to inhibit airflow through the air intake.

8. The cooling system of claim 7, wherein the at least one flap is gravity biased to the open position and is configured to pivot to the closed position based on air flow through the air duct.

9. The cooling system of claim 7, wherein the at least one flap is a plurality of flaps.

10. The cooling system of claim 9, wherein the flaps are arranged substantially orthogonal to an air flow direction of the air duct.

11. A cooling system for a vehicle comprising:
an air duct including an inlet funnel configured to connect to a vehicle grill, a heat-exchanger seat defining an outlet window, and an upper panel extending from the inlet funnel over top of the outlet window, wherein the upper panel defines an intake and is disposed above the outlet window with respect to a vertical direction, the vertical direction being perpendicular to an opening direction of the funnel;
at least one heat exchanger received on the heat-exchanger seat; and
a cooling fan assembly disposed under the at least one heat exchanger and including a shroud and a fan.

12. The cooling system of claim 11 further comprising an air dam disposed in the inlet funnel and configured move between opened and closed positions.

13. The cooling system of claim 11, wherein the intake includes a pivotable flap movable between opened and closed positions.

14. The cooling system of claim 13, wherein the flap is arranged transverse to an air flow path of the air duct.

15. The cooling system of claim 13, wherein the flap is gravity biased to the opened position and is configured to pivot to the closed position based on air flow through the air duct.

16. The cooling system of claim 11, wherein the intake includes a grate and a plurality of flaps pivotally attached to the grate and pivotable between an opened position in which the flaps depend downwardly from the grate and a closed position in which the flaps are disposed against the grate to inhibit airflow through the intake.

17. The cooling system of claim 11, wherein the at least one heat exchanger includes an upper heat exchanger received on the heat-exchanger seat and a lower heat exchanger connected to the shroud, and further comprising a seal disposed between the shroud and the lower heat exchanger, wherein the upper heat exchanger is disposed above the lower heat exchanger with respect to the vertical direction.

18. A cooling system for a vehicle comprising:
an air duct including an inlet funnel configured to connect to a vehicle grill, a heat-exchanger seat defining an outlet window, and an upper panel extending from the inlet funnel over top of the outlet window, wherein the upper panel defines a hole and is disposed above the outlet window with respect to a vertical direction, the vertical direction being perpendicular to an opening direction of the funnel;
an intake including a grate received in the hole and a plurality of flaps pivotally attached to the grate;
at least one heat exchanger received on the heat-exchanger seat; and
a cooling fan assembly disposed under the at least one heat exchanger and including a shroud and a fan.

19. The cooling system of claim 18, wherein the flaps are pivotable between an opened position in which the flaps depend downwardly from the grate and a closed position in which the flaps rotated towards the grate to inhibit airflow through the intake, wherein the flaps are gravity biased to the opened position.

20. The cooling system of claim 18 further comprising a plenum received over the intake and configured to supply air thereto.

* * * * *